United States Patent [19]
Iizuka

[11] Patent Number: 6,151,541
[45] Date of Patent: Nov. 21, 2000

[54] CONTROL DEVICE FOR MOTOR VEHICLE

[75] Inventor: Naonori Iizuka, Fuji, Japan

[73] Assignee: Jatco Corporation, Japan

[21] Appl. No.: 09/163,253

[22] Filed: Sep. 30, 1998

[30] Foreign Application Priority Data

Oct. 7, 1997 [JP] Japan .................................. 9-274485

[51] Int. Cl.[7] ............................ G06F 17/00; G06F 19/00; G06F 7/00

[52] U.S. Cl. ................................ 701/51; 701/35; 701/36; 711/162; 365/228

[58] Field of Search ................................. 701/29, 34, 35, 701/36, 51; 365/226, 228, 229; 455/38.3; 711/100, 102, 103, 104, 162

[56] References Cited

U.S. PATENT DOCUMENTS

| 5,535,409 | 7/1996 | Larvoire et al. | 711/100 |
| 5,712,969 | 1/1998 | Zimmerman et al. | 714/5 |

Primary Examiner—William A. Cuchlinski, Jr.
Assistant Examiner—Gertrude Arthur
Attorney, Agent, or Firm—Rossi & Associates

[57] ABSTRACT

A control device for a motor vehicle includes a central processing unit that is coupled to a non-volatile memory, a volatile memory and a key switch. The control device ensures transmission of data between memories with high reliability when control operation is repeatedly stopped and started upon the turn-off and turn-on of the key switch, while assuring a reduced period of time during which power is supplied from a back-up power supply to the device, and with a reduced frequency of writing of the data.

3 Claims, 4 Drawing Sheets

CONTROL DEVICE FOR MOTOR VEHICLE

BACKGROUND OF THE INVENTION

1. Field of the Invention

The present invention relates to control devices to be installed on a motor vehicle, e.g., an electronic control device of an automatic transmission, which devices are adapted to electronically control various operating states of the motor vehicle.

2. Description of the Prior Art

Control devices for motor vehicles as disclosed in Japanese laid-open Patent Publication Nos. 4-269356 and 5-289949, for example, have been known in the art.

In the control device as disclosed in Japanese laid-open Patent Publication No. 4-269356, modified values stored in RAM are stored into EEPROM through serial communication immediately after a key switch is turned off. The modified values stored in the EEPROM are then re-stored into the RAM immediately after the key switch is turned on. In this manner, the modified values are retained in the EEPROM while the operation of the engine control device is being stopped.

In the control device as disclosed in Japanese laid-open Patent Publication No. 5-289949, data stored in EEPROM are compared with data stored in RAM, and it is determined whether the two data are identical with each other. If the two data are not identical with each other, an operation to delete the data in the EEPROM is performed, and the main routine is finished. The deleting operation has been completed by the time when the next main routine is executed, and new data can be written into the EEPROM. Since the main routine is executed at intervals of 10 ms, data stored in the EEPROM are frequently compared with data stored in the RAM, and the data in the EEPROM are updated. Thus, the latest values are stored in the EEPROM, and the updated data are retained in the EEPROM even after the vehicle is stopped.

The known vehicle control devices as described above, however, suffer from the following problems.

In the control device as disclosed in the Japanese laid-open Patent Publication No. 4-269356, when it is determined that the key switch has just been turned off, the entire region of data that need to be stored is written into the EEPROM, and therefore power needs to be supplied from a backup power supply to a control unit during a period from the time when the key switch is turned off, to the time when all of the data are written into the EEPROM.

In the control device as disclosed in the Japanese laid-open Patent Publication No. 5-289949, data stored in the EEPROM are frequently compared with data stored in the RAM in the main routine executed at intervals of 10 ms, and data in the EEPROM are updated. Thus, the number or frequency of writing is increased where data that are often rewritten or updated must be stored.

SUMMARY OF THE INVENTION

It is therefore an object of the present invention to provide a control device for a motor vehicle, which ensures transmission of necessary data between memories with high reliability while the control operation is repeatedly stopped and started upon turn-off and turn-on of a key switch, while assuring a reduced period of time during which power is supplied from a backup power supply to the device, and reduced frequency of writing of data.

To accomplish the above object, the present invention provides a control device for a motor vehicle as shown in FIG. 1, which comprises: a central processing unit (CPU) 100; a re-programmable nonvolatile memory 101 in which stored data is retained even after a power supply is turned off; a re-programmable volatile memory 102 in which stored data is eliminated when the power supply is turned off; and a key switch 103, wherein the central processing unit (CPU) 100 comprises: switch operation judging means 104 for determining whether the key switch 103 is placed in an ON state or an OFF state; normal control means 105 for controlling an operating state of the vehicle according to a calculated control amount while the key switch is in the ON state, obtaining data that is judged from a control result as being necessary to be stored, and storing the data in the volatile memory 102; stored data comparing means 106 for comparing the data stored in the volatile memory 102 with data stored in the nonvolatile memory 101, immediately after the key switch 103 is turned off, to check if the data stored in the volatile memory is identical with that stored in the nonvolatile memory; data storing means 107 for storing only a portion of the data stored in the volatile memory 102 that is different from that stored in the nonvolatile memory 101, into the nonvolatile memory 101, when there is a difference between the data stored in the volatile memory and the data stored in the nonvolatile memory; and data restoring means 108 for restoring the data stored in the nonvolatile memory 101 into the volatile memory 102 immediately after the key switch 103 is turned on.

In one preferred form of the present invention, the normal control means includes shift control means for performing shift control and line pressure control of an automatic transmission, and the data that is judged as being necessary to be stored comprises a correction value used for correcting a hydraulic pressure generated upon shifting of the automatic transmission.

In another preferred form of the present invention, the normal control means includes shift control means for performing shift control and line pressure control of an automatic transmission, and the data that is judged as being necessary to be stored comprises information on fault of the automatic transmission.

BRIEF DESCRIPTION OF THE DRAWINGS

The invention will be described in greater detail with reference to preferred embodiments thereof and the accompanying drawings, wherein.

DETAILED DESCRIPTION OF THE PREFERRED EMBODIMENTS

First Embodiment

As one example of control devices for a motor vehicle, a shift control device of an automatic transmission according to the first embodiment of the present invention will be described in detail.

Preconditions and Basic Idea

Here, data that are obtained by learning and updated according to shifting experiences, and fault data that are essential when performing shift control in the next cycle, for example, are considered as necessary data (data that need to be stored in a EEPROM). With regard to a system employed for writing, storing, receiving and supplying the necessary data, the preconditions (hardware structure) and the basic idea will be first described.

1. Preconditions (hardware structure)

The system includes EEPROM, and permits serial communication (two-way or bidirectional) between a CPU and the EEPROM.

The system is able to detect the ON/OFF state of the key switch, and is capable of supplying power to an A/T control unit during a period from the time when the key switch is turned OFF, to the time when the operation for writing the content of the RAM that needs to be backed up, into the EEPROM, is finished.

2. Basic Idea (1) The content of the EEPROM is written into a backup area of the RAM when the key switch is operated from the OFF state to the ON state. At this time, if the sum of data stored when written into the EEPROM is different from the total of the backup area of the RAM, data in the backup area of the RAM is cleared.

By clearing data in the backup area of the RAM, data of the EEPROM read in the current cycle are all made equal to zero. Thus, writing of the data into the EEPROM results in clearing of all values of the EEPROM.

(2) When the key switch is operated from the ON state to the OFF state, the content of the EEPROM is compared with the content of the backup area of the RAM, and only a portion of the content of the RAM that is different from a corresponding portion of the content of the EEPROM is written into the EEPROM. At this time, the total of data in the EEPROM is calculated, and stored as a sum.

Figure 1:
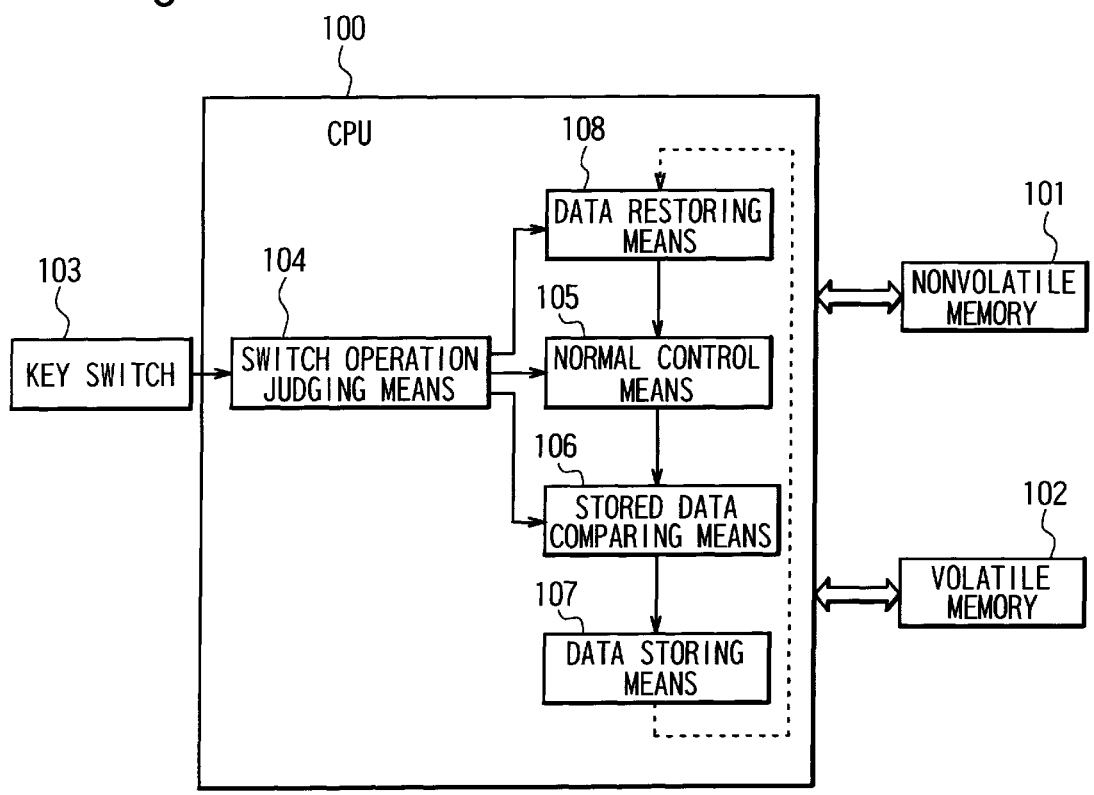
FIG. 1 is a view showing a control device for a motor vehicle according to the present invention.
Figure 2:
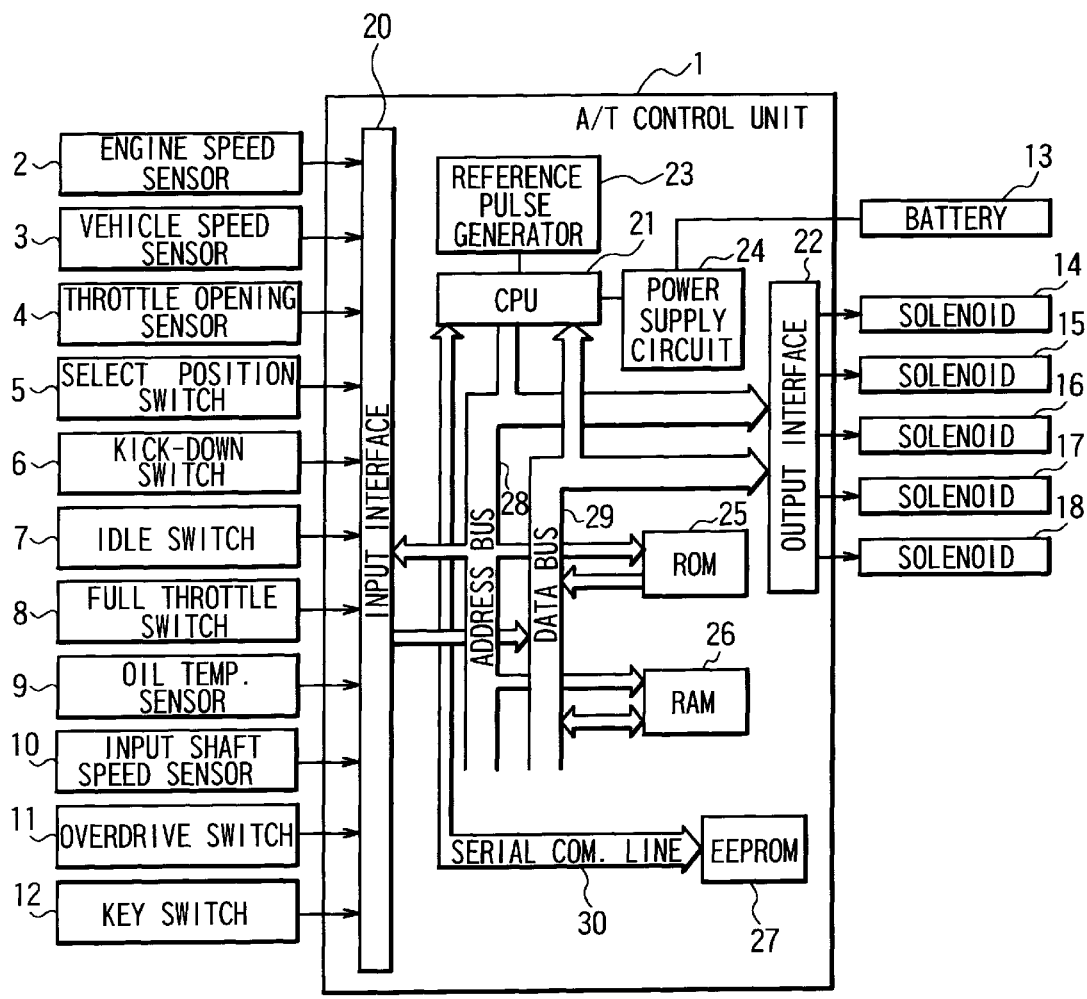
FIG. 2 is a block diagram showing a shift control device (one example of the vehicle control device) of an automatic transmission according to the first embodiment of the present invention.

FIG. 2 is a block diagram showing the shift control device of the automatic transmission. Referring to FIG. 2, the construction of the shift control device will be described.

In FIG. 2, the shift control device includes the A/T control unit 1, engine speed sensor 2, vehicle speed sensor 3, throttle opening sensor 4, select position switch 5, kick-down switch 6, idle switch 7, full throttle switch 8, oil temperature sensor 9, input shaft speed sensor 10, overdrive switch 11, key switch 12, battery or power supply 13, and solenoids 14, 15, 16, 17 and 18. The A/T control unit 1 includes an input interface 20, central processing unit 21 (that corresponds to CPU 100 and will be called "CPU"), output interface 22, reference pulse generator 23, power supply circuit 24, read-only memory 25 (that will be also called "ROM"), random access memory 26 (that corresponds to volatile memory 102 and will be called "RAM"), EEPROM 27 (corresponding to nonvolatile memory 101), address bus 28, data bus 29, and a serial communication line 30.

Sensor signals and switch signals from the above-indicated sensors and switches 2 through 12 are received by the input interface 20 of the A/T control unit 1, and then converted into corresponding signals that are to be processed by the control unit 1.

The battery 13 is connected to the CPU 21 via the power supply circuit 24 of the A/T control unit 1, to be used as a backup power supply for operating the CPU and retaining or keeping data stored in the EEPROM 27 after a main power supply is turned off by the key switch 12.

The solenoids 14–18 are control actuators that operate according to commands received from the output interface 22 of the A/T control unit 1. More specifically, the solenoids 14–18 include shift solenoids used for shift control, a line-pressure solenoid used for controlling the line pressure, and a lock-up solenoid used for controlling a lockup clutch.

The CPU 21 is a central processing unit for processing input data based on predetermined control programs. Data are transmitted from the input interface 20, ROM 25 and RAM 26, to the CPU 21 and the output interface 22, via the data bus 29, and addresses are transmitted from the CPU 21 to the input interface 20, output interface 22, ROM 25 and RAM 26, via the address bus 28, while data are transmitted from the CPU 21 to the RAM 26 via the data bus 29. Also, the serial communication line 30 connects a serial port of the CPU 21 with a serial port of the EEPROM 27, so that data that are arranged in order are transmitted and received by two-way communication.

The ROM 25 is a read-only memory exclusively used for reading data, and stores in advance data needed for control. The RAM 26 is a memory from which stored data is eliminated when a power supply is turned off. Data can be written into and read from the RAM 26 by freely designating an arbitrary address. The EEPROM (electrically erasable programmable ROM) 27 is a ROM from which stored data does not disappear even if the power supply is turned off, though data written into the EEPROM may be deleted, and new data may be rewritten into this memory.

The operation of the shift control device will be now explained.

Figure 3:
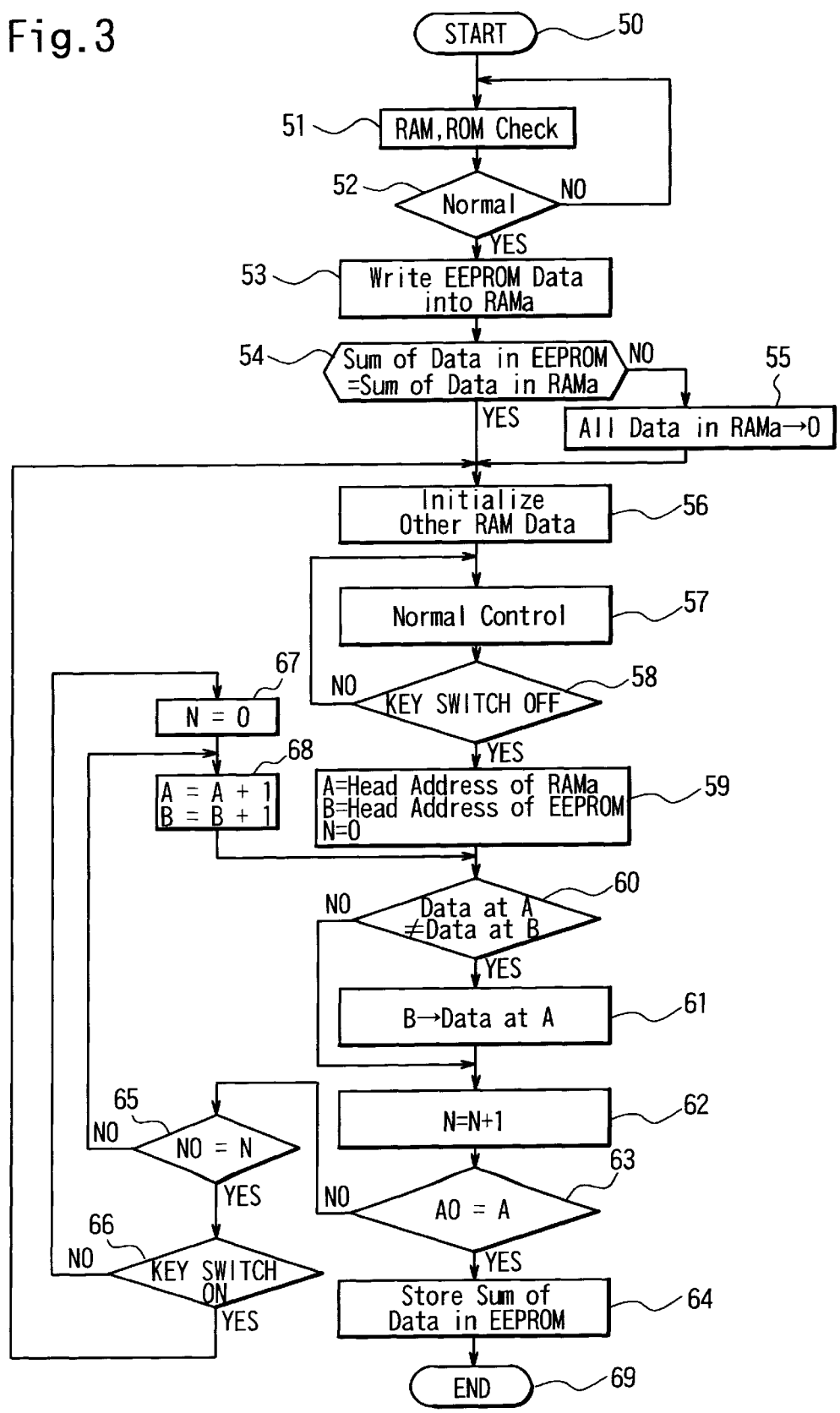
FIG. 3 is a flowchart showing the flow of a control operation that is performed by an A/T control unit of the shift control device of the automatic transmission of the first embodiment.

FIG. 3 is a flowchart showing the flow of control processing that is implemented by the A/T control unit 1 (CPU 21). Each step of the control flow will be described.

In step 50, the A/T control unit 1 is started by turning on the key switch 12 thereby to turn on the main power supply. Upon start of the A/T control unit 1, step 51 is executed to check the operation of the storage devices (ROM 25, RAM 26).

In step 52 it is determined whether the storage devices operate normally or not. If the storage devices operate normally or properly, the control flow goes to step 53. If step 52 determines that the storage devices operate abnormally, the control flow goes back to step 51, and check of the operations of the devices is made again.

In step 53, data stored in the EEPROM 27 is written into RAMa. Here, RAMa does not mean the presence of a RAM named RAMa, but represents, for the sake of convenience, a portion of the RAM 26 into which data that has been judged as being necessary to be stored is written. (Step 53 corresponds to data restoring means 108.)

Step 54 determines if the sum of data stored in advance in the EEPROM 27 coincides with the sum of data written into the RAMa in step 53 of the current cycle. The control flow goes to step 56 if an affirmative decision (YES) is obtained in step 54. If it is determined that the EEPROM 27 is at fault in step 54, the control flow goes to step 55.

In step 55, all of the data of in the RAMa is cleared. In step 56, RAM data that is not associated with the RAMa is initialized.

In step 57, shift control, line pressure control and other controls of the automatic transmission are performed according to calculated control amounts, and data (such as a correction value for correcting the hydraulic pressure generated upon shifting of the automatic transmission, and fault information of the automatic transmission) that are judged from the control results as being necessary to be stored are obtained, and the data are stored in the RAMa. (Step 57 corresponds to normal control means 105).

In step 58, it is determined whether the key switch 12 is in the OFF state or not. (This step corresponds to switch operation judging means 104). If the key switch 12 is ON, step 57 is executed to continue the normal control operation. If the key switch 12 is OFF, stop processing of step 59 and following steps is performed.

In step 59, the head address of the RAMa is pointed by A, and the head address of the EEPROM 27 is pointed by B, while the number or frequency of processing N is made equal to 0.

In step 60, data of RAMa stored at the address pointed by A is compared with data of EEPROM 27 stored at the address pointed by B. (This step corresponds to stored data comparing means 106.) The control flow goes to step 62 if both data are identical with each other, and goes to step 61 if these data are not identical with each other.

In step 61, the data of RAMa at the address pointed by A is written into the EEPROM 27 at the address pointed by B. (This step corresponds to data storing means 107.) In step 62, the number of processing N is made equal to N+1.

In step 63, it is determined whether the address pointed by A is equal to the end address AO of the RAMa. If an affirmative decision (YES) is obtained in step 63, data stored in the entire region of the RAMa has been written into the EEPROM 27, and the control flow goes to step 64. If a negative decision (NO) is obtained in step 63, the control flow goes to step 65.

In step 64, the sum of all data of the EEPROM 27 is stored in the EEPROM 27 so as to be checked in the next control cycle, and the control flow goes to step 69.

In step 65, the number of processing N is compared with a predetermined value NO, so that the operating state of the key switch 12 is judged at regular intervals even while writing processing is being performed. The control step goes to step 66 if N is equal to NO, and goes to step 68 if N is not equal to NO.

Step 66 determines if the key switch 12 is in the ON state or not. The control flow goes to step 56 if the key switch 12 is ON, and goes to step 67 if the switch 12 is OFF.

In step 67, the number of processing N is made equal to 0. In step 68, A is made equal to A+1, and B is made equal to B+1, namely, A and B are respectively incremented. The control flow then goes to step 60.

In step 69, the processing operation of the CPU 21 is stopped.

As illustrated above, in this embodiment, while the vehicle is running with the key switch 12 being in the ON state, the shift control, line pressure control and other controls of the automatic transmission are performed according to calculated control amounts, and data (such as a correction value for correcting the hydraulic pressure generated upon shifting of the automatic transmission, and fault information of the automatic transmission) that are judged from the control results as being necessary to be stored are obtained, and stored in the RAMa in step 57.

When the key switch 12 is then turned OFF, step 60 is executed immediately after the turn-off operation to compare data of RAMa stored at an address pointed by A with data of EEPROM 27 stored at an address pointed by B. If the data of the RAMa at the address pointed by A is identical with the data of the EEPROM 27 at the address pointed by B, step 60 is followed by step 62, step 63, step 65, and step 68, and the control flow then returns to step 60 to compare data at the next addresses, without performing any writing operation. If data of RAMa stored at the address pointed by A is different from data of EEPROM 27 stored at the address pointed by B, the control flow goes to step 61 to write the RAMa data at the address pointed by A, into the EEPROM at the address designated by B, and step 61 is followed by step 62, step 63, step 65 and step 68, to return to step 60, so as to compare data at the next addresses.

When it is determined in step 63, after the above processing is repeated, that the address currently pointed by A is equal to the end address A0 of RAMa, which means that writing into the entire region of the EEPROM has been finished, the processing operation is stopped, and necessary data is written from the RAM 26 into the EEPROM 27 adapted to retain stored data as it is even if the power supply is turned off.

If the key switch 12 is then turned ON to start the system, the data stored in the EEPROM 27 is written into the RAMa in step 53, and learned data or fault data as necessary data are passed on to the system without being eliminated due to turn-off of the power supply.

The advantages of the present embodiment will be next described.

(1) In the conventional device as described in Japanese laid-open Patent Publication No. 4-269356, all of data in the entire region that need to be stored are written into EEPROM when it is determined that the key switch has just been turned off, and therefore power needs to be supplied from the backup power supply to the control unit during the period from the time when the key switch is turned off, to the time when all data are written into the EEPROM, which results in an increased time required for supplying power.

In the first embodiment of the present invention, on the other hand, data stored in the RAM 26 are compared with data stored in the EEPROM 27, and only an address portion storing different data is written into the EEPROM 27. Accordingly, the time required for writing data into the EEPROM 27, namely, the time of the operation of the backup power supply, can be reduced as compared with that of the conventional device.

(2) In the conventional device disclosed in Japanese laid-open Patent Publication No. 5-289949, data stored in EEPROM is constantly compared with data stored in RAM in the main routine that is executed at intervals of 10 ms, so as to update the data in the EEPROM. Thus, the number or frequency of writing is increased when storing data that must be rewritten many times, for example, data obtained by learning, such as a correction value for correcting the hydraulic pressure in shift control.

In the first embodiment of the present invention, on the other hand, data is written into the EEPROM 27 only once when the key switch 12 is turned off, and therefore the number or frequency of writing can be significantly reduced as compared with that of the conventional control device.

Second Embodiment

In the first embodiment as described above, the CPU 21 communicates with the EEPROM 27 through two-way serial communication. In the second embodiment, on the other hand, the communication between the CPU 21 and the EEPROM 27 is achieved utilizing an address bus 28 and a data bus 29.

Figure 4:
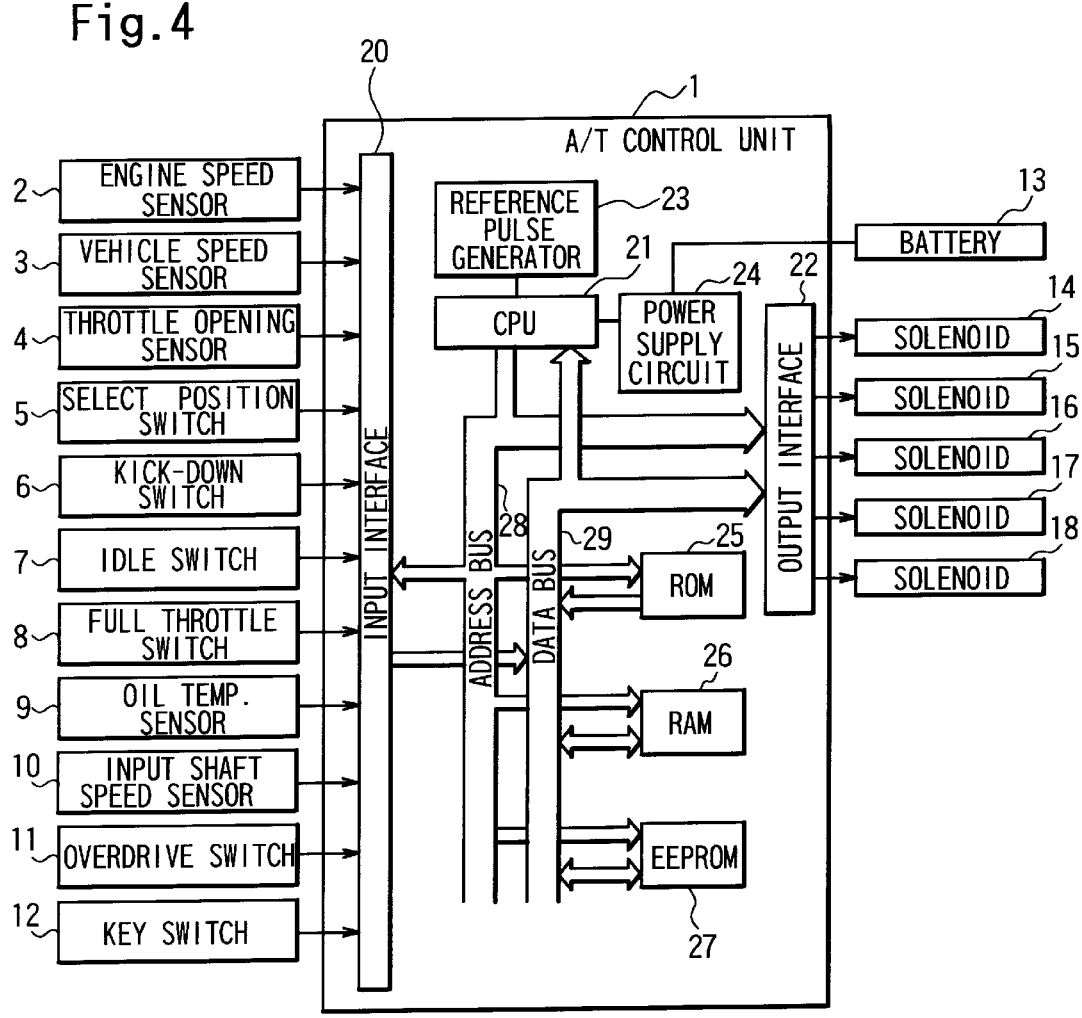
FIG. 4 is a block diagram showing a shift control device of an automatic transmission according to the second embodiment of the present invention.

More specifically described referring to FIG. 4, addresses are transmitted from the CPU 21 to the EEPROM 27 through the address bus 28, and data are transmitted from the CPU 21 to the EEPROM 27 through the data bus 29, while data are transmitted from the EEPROM 27 to the CPU 21 also through the data bus 29.

The other arrangements, operations and effects are similar to those of the first embodiment, and therefore will not be explained herein.

Other Embodiments of the Invention

While the present invention is applied to a shift control device of an automatic transmission in the first and second embodiments, this invention is also applicable to other electronic control devices, such as Engine control device, Traction control system, 4-Weel steering control device, Anti-brake system, suspension control device, that are installed on a motor vehicle.

In the first and second embodiments, necessary data include a correction value used for correcting the hydraulic pressure generated upon shifting of an automatic transmission, and information on fault of the transmission, for example. The necessary data, however, may include other learned information, such as a correction value for correcting the time for which controlled hydraulic pressure is generated upon shifting, and other information which will have an influence on the control of the transmission later.

In the control device for a motor vehicle according to the present invention, which includes a central processing unit (CPU), a re-programmable nonvolatile memory in which stored data is retained even after a power supply is turned off, a re-programmable volatile memory in which stored data is eliminated when the power supply is turned off, and a key switch, the CPU includes switch operation judging means for determining whether the key switch is placed in the ON state or OFF state; normal control means for controlling an operating state of the vehicle according to a calculated control amount while the key switch is in the ON state, obtaining data that is judged from a control result as being necessary to be stored, and storing the data in the volatile memory; stored data comparing means for comparing the data stored in the volatile memory with data stored in the nonvolatile memory immediately after the key switch is turned off, to check if the data stored in the volatile memory is identical with that stored in the nonvolatile memory; data storing means for storing only a portion of the data stored in the volatile memory that is different from that stored in the nonvolatile memory, into the nonvolatile memory, when there is a difference between the data stored in the volatile memory and the data stored in the nonvolatile memory; and data restoring means for restoring the data stored in the nonvolatile memory into the volatile memory immediately after the key switch is turned on.

With this arrangement, the resulting vehicle control device ensures transmission of necessary data between memories with high reliability while the control operation is repeatedly stopped and started upon turn-off and turn-on of the key switch, while assuring a reduced period of time during which power is supplied from a backup power supply to the device, and reduced frequency of writing of data.

In the vehicle control device as described above, the normal control means may include shift control means for performing shift control and line pressure control of an automatic transmission, and the data that is judged as being necessary to be stored may comprise a correction value used for correcting the hydraulic pressure generated upon shifting of the automatic transmission. In this case, the correction value is not set to an initial value each time the vehicle starts running, but obtained as learned data that is derived from numerous shifting experiences that have been accumulated up to the present, thus enabling the control device to achieve shift control with considerably good shifting quality, regardless of variations of the value, chronological changes, and so on.

In the vehicle control device as described above, the normal control means may include shift control means for performing shift control and line pressure control of an automatic transmission, and the data that is judged as being necessary to be stored may comprise information on fault of the automatic transmission. In this case, the automatic transmission is suitably controlled after its fault is detected and the key switch is turned off, without requiring further judgement or detection of the fault of the transmission, thus enabling the control device to immediately start a fail-safe operation when the key switch is turned on.

What is claimed is:

1. A control device for a motor vehicle, comprising:

a central processing unit;

a re-programmable nonvolatile memory in which stored data is retained even after a power supply is turned off, a re-programmable volatile memory in which stored data is eliminated when the power supply is turned off; and a key switch, wherein the central processing unit comprises:

switch operation judging means for determining whether the key switch is placed in an ON state or an OFF state;

normal control means for controlling an operating state of the vehicle according to a calculated control amount while the key switch is in the ON state, obtaining data that is judged from a control result as being necessary to be stored and storing the data in the volatile memory;

stored data comparing means for comparing the data stored in the volatile memory with data stored in said nonvolatile memory immediately after the key switch is turned off, to check if the data stored in the volatile memory is identical with that stored in the nonvolatile memory;

data storing means for storing only a portion of the data stored in the volatile memory that is different from that stored in the nonvolatile memory, into the nonvolatile memory, when there is a difference between the data stored in the volatile memory and the data stored in the nonvolatile memory; and data restoring means for restoring the data stored in the nonvolatile memory into the volatile memory immediately after the key switch is turned on;

wherein the nonvolatile memory, the volatile memory and the key switch are each coupled to the central processing unit.

2. A control device for a motor vehicle according to claim 1, wherein said normal control means includes shift control means for performing shift control and line pressure control of an automatic transmission, and wherein the data that is judged as being necessary to be stored comprises a correction value used for correcting a hydraulic pressure generated upon shifting of the automatic transmission.

3. A control device for a motor vehicle according to claim 1, wherein said normal control means includes shift control means for performing shift control and line pressure control of an automatic transmission, and wherein the data that is judged as being necessary to be stored comprises information on fault of the automatic transmission.

* * * * *